United States Patent
Swier et al.

(10) Patent No.: US 11,325,308 B2
(45) Date of Patent: May 10, 2022

(54) MOVING POWDER IN A 3D PRINTING SYSTEM

(71) Applicant: HEWLETT-PACKARD DEVELOPMENT COMPANY, L.P., Spring, TX (US)

(72) Inventors: Kevin E Swier, Corvalis, OR (US); Steve Ringwald, Corvalis, OR (US); Kevin Hulick, Corvalis, OR (US); Gunay Ozturk, Corvalis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/603,552

(22) PCT Filed: Sep. 1, 2017

(86) PCT No.: PCT/US2017/049977
§ 371 (c)(1),
(2) Date: Oct. 7, 2019

(87) PCT Pub. No.: WO2019/045757
PCT Pub. Date: Mar. 7, 2019

(65) Prior Publication Data
US 2020/0198241 A1    Jun. 25, 2020

(51) Int. Cl.
*B29C 64/343* (2017.01)
*B33Y 10/00* (2015.01)
(Continued)

(52) U.S. Cl.
CPC .......... *B29C 64/343* (2017.08); *B29C 64/153* (2017.08); *B29C 64/329* (2017.08); *B33Y 10/00* (2014.12); *B33Y 30/00* (2014.12)

(58) Field of Classification Search
CPC ... B29C 64/343; B29C 64/321; B29C 64/329; B29C 64/153; B29C 64/357; G01F 11/24
See application file for complete search history.

(56) References Cited

U.S. PATENT DOCUMENTS

| 4,747,524 A | 5/1988 | Krambrock |
| 7,291,002 B2 | 11/2007 | Russell et al. |

(Continued)

FOREIGN PATENT DOCUMENTS

| CN | 101495294 A | 7/2009 |
| WO | WO2007139938 A2 | 12/2007 |

(Continued)

OTHER PUBLICATIONS

Pneumatic Vacuum Conveyors < http://www.volkmannusa.com/productssupport/pneumatic-vacuum-conveyors/ >.

*Primary Examiner* — Joseph S Del Sole
*Assistant Examiner* — Ariella Machness
(74) *Attorney, Agent, or Firm* — Dierker & Kavanaugh PC

(57) ABSTRACT

In an example implementation, a powder metering device to move powder in a 3D printing system includes a rotor comprising a central hub and peripheral wheel to rotate about a shaft. Compartments are formed between the hub and the wheel by a plurality of fins that emanate from the hub at first fin ends and affix to the wheel at second fin ends. A top and bottom disk each have a planar surface to lie flush against and to seal, respectively, top and bottom perimeters of each compartment as the compartments rotate about the shaft between a powder receiving position and a powder dispensing position.

10 Claims, 6 Drawing Sheets

(51) Int. Cl.
*B33Y 30/00* (2015.01)
*B29C 64/329* (2017.01)
*B29C 64/153* (2017.01)

(56) References Cited

U.S. PATENT DOCUMENTS

| | | |
|---|---|---|
| 7,296,599 B2 | 11/2007 | Cox |
| 7,828,022 B2 * | 11/2010 | Davidson ............... B33Y 30/00 141/18 |
| 7,887,316 B2 | 2/2011 | Cox |
| 8,636,173 B2 * | 1/2014 | Bartholomew ..... B01F 13/1061 222/1 |
| 2008/0006334 A1 * | 1/2008 | Davidson ............... B33Y 30/00 137/571 |
| 2008/0047972 A1 | 2/2008 | Bartholomew et al. |
| 2009/0236778 A1 | 9/2009 | Boot et al. |
| 2013/0098945 A1 | 4/2013 | Webster et al. |

FOREIGN PATENT DOCUMENTS

| | | |
|---|---|---|
| WO | WO2016131785 A1 | 8/2016 |
| WO | WO2016205855 A1 | 12/2016 |
| WO | WO-2019022751 A1 | 1/2019 |

\* cited by examiner

MOVING POWDER IN A 3D PRINTING SYSTEM

BACKGROUND

Additive manufacturing processes can produce three-dimensional (3D) parts by providing a layer-by-layer accumulation and solidification of build material patterned from digital models. In some examples, powdered build material such as powdered nylon can be processed using heat to cause melting and solidification of the material in selected regions of each layer. In some examples, the solidification of build material can be accomplished in other ways, such as through the use of binding agents or chemicals. The solidification of selected regions of build material can form 2D cross-sectional layers of the 3D object being produced, or printed.

BRIEF DESCRIPTION OF THE DRAWINGS

Examples will now be described with reference to the accompanying drawings, in which.

Throughout the drawings, identical reference numbers designate similar, but not necessarily identical, elements.

DETAILED DESCRIPTION

Figure 1:
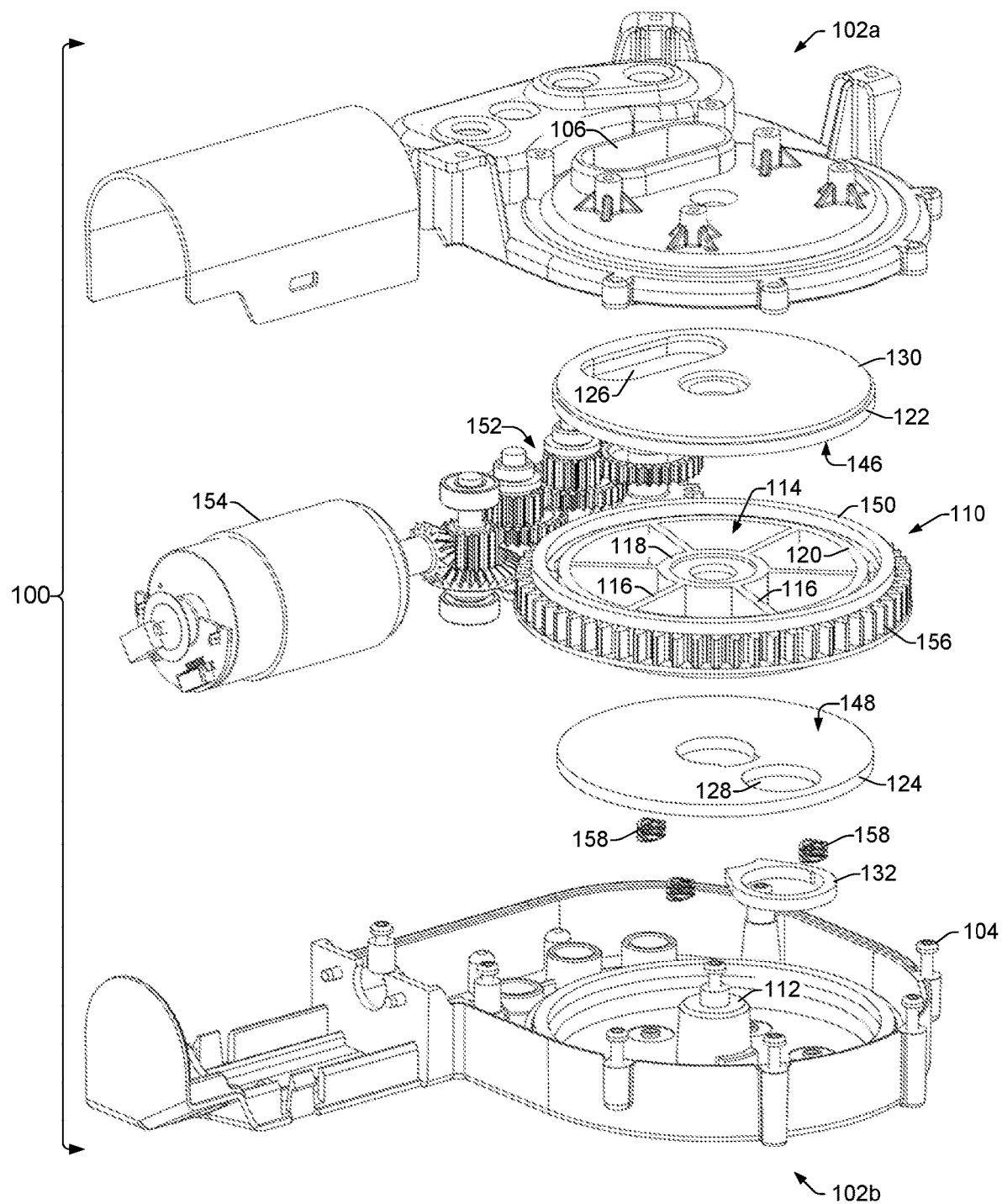
FIGS. 1 and 2 show exploded view drawings of an example of a powder metering device for moving powder in a 3D printing system.

Additive manufacturing processes such as 3D printing can use different powdered build materials to produce parts or objects having a variety of different characteristics. The terms 'part' and 'object' and their variants may be used interchangeably throughout this description. The powdered build materials can comprise fine dust-like particles that help to produce sharp details in the manufactured parts. While example methods and devices are discussed herein with regard to powdered build materials, such methods and devices can be equally applicable for use with other types of build materials that may be available now or in the future. Thus, in different examples, build materials can include various types and forms of material such as powder material, small fiber material, beaded material, and so on.

In some examples, 3D printing processes can include spreading layers of powdered build material (e.g., nylon or other plastic) over a platform or print bed within a work area. A fusing agent can be selectively applied to each layer where the particles of powdered material are to be fused together. Each layer in the work area can be exposed to a fusing energy to fuse together the particles of powdered material where the fusing agent has been applied. The process can then be repeated, one layer at a time, until a part or parts have been formed within the work area. Other 3D printing processes, such as selected laser sintering (SLS) systems also use powdered build material.

In some example 3D printing processes, powdered build material can be transported throughout a 3D printing system pneumatically. For example, pressurized air from a pressure blower can be applied to a transport tube as powdered build material is being released into the tube from a powder storage area. The movement of the air under positive pressure can transport the powder through the tube to different locations within the 3D printing system. In other examples, pneumatic systems can use negative pressure to move powder through the system. For example, the movement of air under negative pressure from vacuum blowers can facilitate the transport of powder through transport tubes to different locations within the 3D printing system.

In some examples, transporting powdered build material within 3D printing systems using a pneumatic transport system can present challenges, such as how accurate amounts of the powdered material are to be moved between differently pressurized regions of the 3D printing system. For example, in some 3D printing systems powder can be collected and held in a hopper under ambient pressure prior to being transported to another destination within the 3D printing system through a positively or negatively pressurized pneumatic system. In such systems, the pressure differential between the environment in the hopper and the pressurized pneumatic system can hinder the transfer of accurate amounts of powder from the hopper into the pneumatic system.

Accordingly, example methods and devices described herein enable the delivery of a controlled amount of powder from one pressure environment into another pressure environment within a 3D printing system. More specifically, the described examples enable the receipt of a controlled amount of powder from one pressure environment and the simultaneous delivery of a controlled amount of powder into another pressure environment. The pressure differential between two environments can be positive or negative or zero. Thus, powder can be delivered from a low to a high pressure environment, from a high to a low pressure environment, or between environments having like pressures.

An example rotor device comprises a multi-compartment, pressure-isolation system that rotates compartments sequentially to deliver powder from a powder receiving position under one pressure environment, to a powder dispensing position under another pressure environment. Compartments are formed on the rotor between fins or spokes that extend from a central hub of the rotor out to a peripheral wheel of the rotor. The tops and bottoms of the compartments comprise top and bottom sealing disks pressed flush against the fins. Powder is metered according to the size of the compartments, and the amount of powder dispensed for a given amount of time can be controlled by adjusting the speed of rotation of the compartments.

As each compartment rotates about a central shaft from the powder receiving position to the powder dispensing position, the compartment rotates through a pressure-isolation position that seals the compartment off from the pressure environments of the receiving and dispensing positions. Compartments receive powder from a powder source (e.g., a powder hopper) by gravitational drop as they rotate through the receiving position underneath an input hole formed in the top sealing disk. Compartments dispense powder to a powder destination (e.g., a pneumatic powder transport system) by gravitational drop as they rotate through the dispensing position over an output hole formed in the stationary bottom sealing disk. The powder is dispensed in a discontinuous manner in discrete dosed units. In some examples, multiple compartments can be receiving powder while multiple other compartments are dispensing powder.

In a particular example, a powder metering device to move powder in a 3D printing system includes a rotor comprising a central hub and peripheral wheel to rotate about a shaft. Compartments are formed between the hub and the wheel by a plurality of fins that emanate from the hub at first fin ends and affix to the wheel at second fin ends. A top and bottom disk each have a planar surface to lie flush against and to seal, respectively, top and bottom perimeters of each compartment as the compartments rotate about the shaft between a powder receiving position and a powder dispensing position.

In another example, a method of moving powder in a 3D printing system includes receiving powder from a first pressure zone into a first compartment as the first compartment rotates past a receiving position, dispensing powder from the first compartment into a second pressure zone as the first compartment rotates past a dispensing position, and pressure-isolating the first compartment from the first and second pressure zones as it rotates between the receiving and dispensing positions.

In another example, a powder metering device to move powder in a 3D printing system includes multiple compartments to transfer powder from a first pressure environment to a second pressure environment. The device also includes a pressure-isolation position to isolate the compartments from both the first pressure environment and the second pressure environment.

Figure 2:
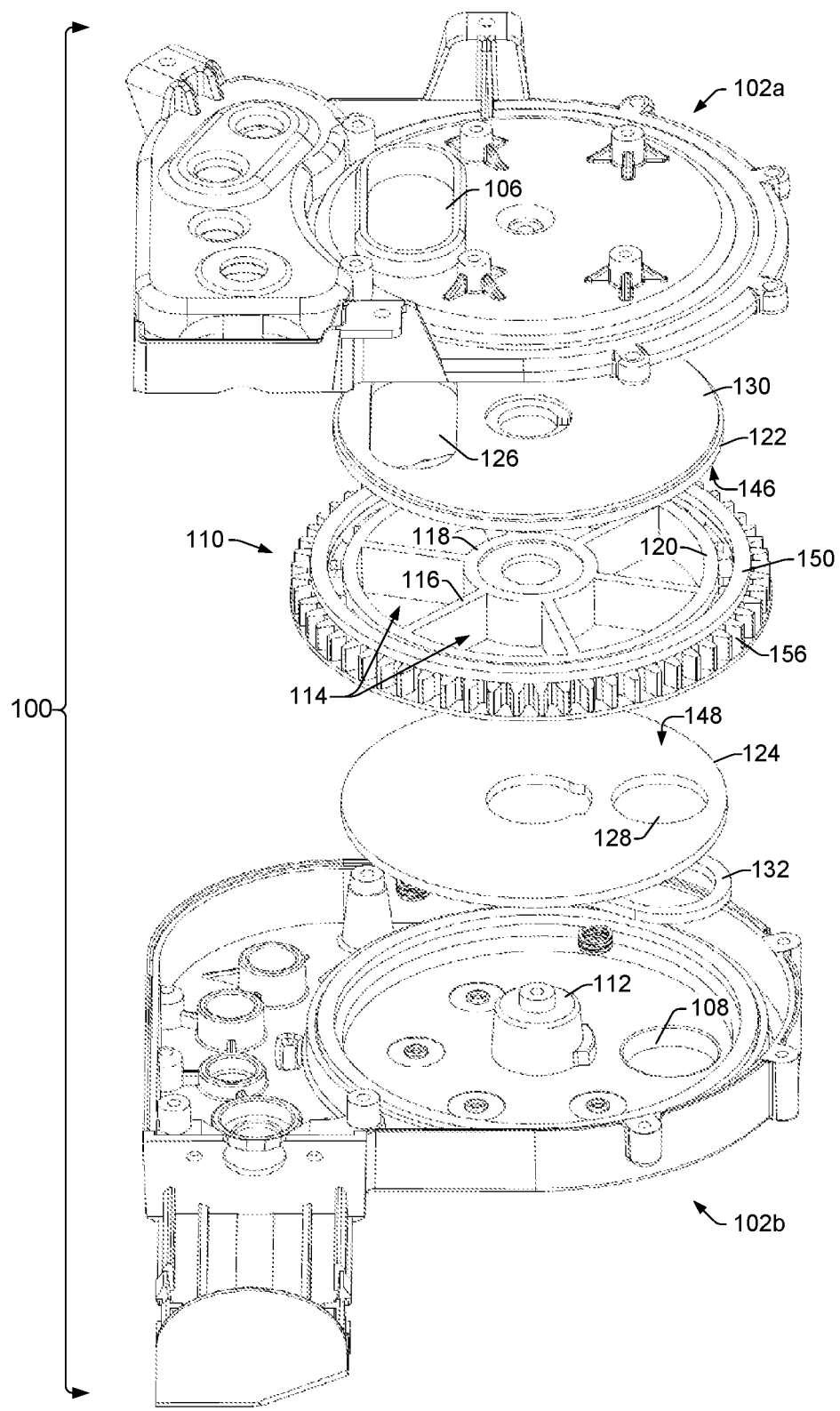
Figure 3:
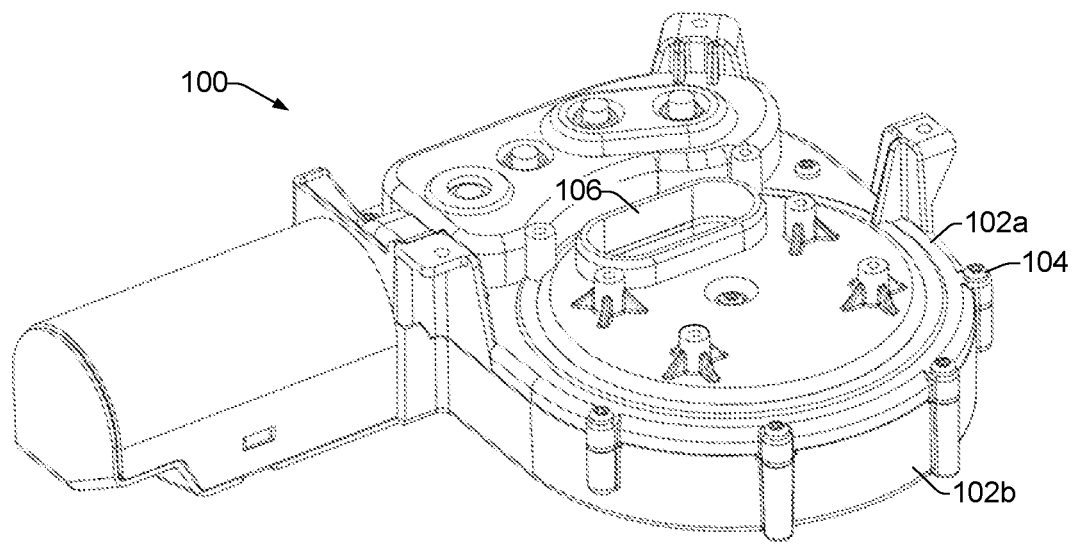
FIG. 3 shows a top side perspective view drawing of an example of an assembled powder metering device.
Figure 4:
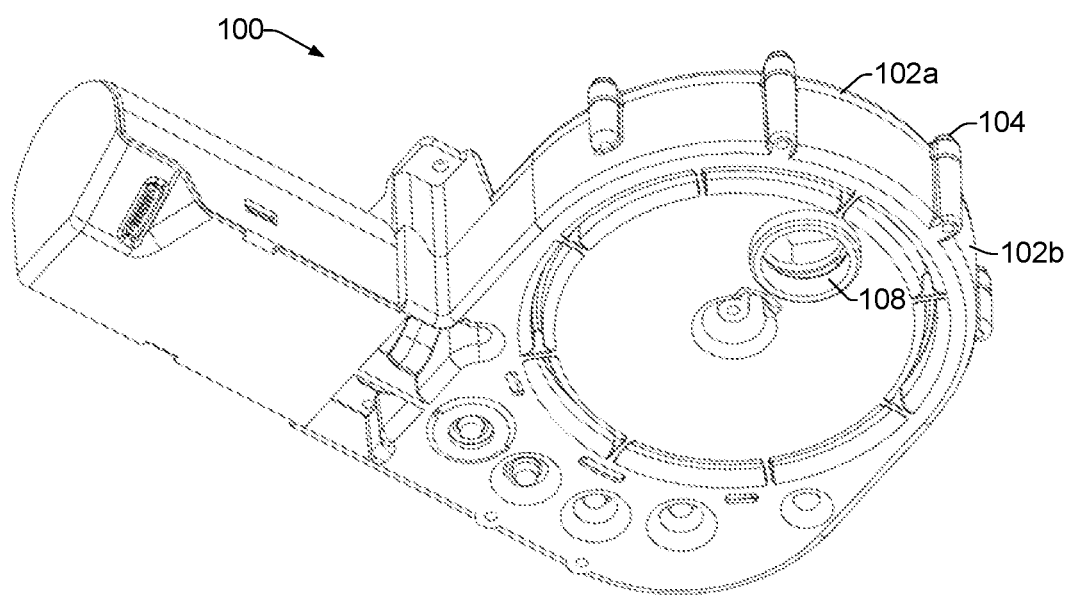
FIG. 4 shows a bottom side perspective view drawing of an example of an assembled powder metering device.

FIGS. 1 and 2 show exploded view drawings of an example of a powder metering device 100 for moving powder in a 3D printing system. The FIG. 1 drawing shows the powder metering device 100 in a first view, and the FIG. 2 drawing shows the powder metering device 100 in a second view. For the purpose of illustration, and due to the different views shown in FIGS. 1 and 2, some features and/or components of the powder metering device 100 shown in FIG. 1 may not be shown in FIG. 2, and vice versa. FIG. 3 shows a top side perspective view drawing of an example of an assembled powder metering device 100. FIG. 4 shows a bottom side perspective view drawing of an example of an assembled powder metering device 100.

Referring generally to FIGS. 1-4, an example powder metering device 100 comprises a number of inner components compressibly enclosed within a housing. The housing can include an upper housing 102a and a lower housing 102b that can be fastened together with fasteners 104 such as screws or clamps. The housing includes features that functionally correspond with the inner components to facilitate the movement of powder into the device 100 from a first pressure environment, and out of the device 100 to a second pressure environment. For example, the upper housing 102a includes an entrance hole 106 to enable powder to pass through the upper housing into the device 100, and the lower housing 102b includes an exit hole 108 to enable powder to pass through the lower housing out of the device 100.

The example powder metering device 100 comprises a rotor 110 to rotate about a central shaft 112. Compartments 114 are formed on the rotor 110 by fins 116 (or spokes 116) that emanate from a central hub 118 of the rotor 110 and extend outward to a peripheral wheel 120 of the rotor 110. The fins 116 are affixed at one end to the central hub 118 and at the other end to the wheel 120. Thus, the sides or walls of each compartment 114 comprise two fins 116, a portion of the central hub 118, and a portion of the peripheral wheel 120. Each compartment 114 shares two fins 116 with neighboring compartments on either side. While the term 'fin' is used throughout this description to reference the spokes 116 emanating from the central hub and forming the walls of each compartment 114, there is no intent to limit the geometry of the spokes 116 to any particular fin shape. Thus, other geometries than those shown in FIGS. 1 and 2 for the spokes 116 and for the compartments 114 are possible and are contemplated herein. For example, compartments 114 can be customized for specific applications and therefore may comprise geometries other than the pie-shaped geometry shown. In some examples, the fins 116 or the walls of the compartments 114 can be angled to form an impeller geometry to help optimize powder inlet and outlet efficiencies. Furthermore, while the example powder metering device 100 shown in FIGS. 1 and 2 comprises six compartments 114, other examples can include a greater or lesser number of compartments. For example, a powder metering device 100 may include as few as one compartment or greater than six compartments. In general, a greater number of compartments 114 reduces the size of the compartments and increases the metering resolution of the powder metering device 100 by dividing the powder being transferred through the device 100 into smaller amounts. The number of compartments 114 can be changed for dosing accuracy and fill efficiency with relation to rotational speeds and powder material characteristics.

The powder metering device 100 further comprises top and bottom sealing disks 122, 124, that remain stationary as the rotor 110 and compartments 114 rotate between them around the shaft 112. The top and bottom sealing disks 122, 124, seal the compartments 114 as they rotate between a powder receiving position and a powder dispensing position, as discussed below in more detail. In addition to preventing powder from escaping from the compartments 114, the sealing disks, 122, 124, seal the compartments against air going into or out of the compartments and provide an air-locked environment. The top sealing disk 122 comprises an input hole 126 corresponding with the entrance hole 106 of the upper housing 102a, and the bottom sealing disk 124 comprises an output hole 128 corresponding with the exit hole 108 of the lower housing 102b. A compliant seal 130 between the top sealing disk 122 and the upper housing 102a provides an air seal and helps to prevent powder from escaping from between the entrance hole 106 of the upper housing 102a and the input hole 126 of the top sealing disk 122. The compliant seal 130 has adhesive on both sides, and it is adhered by a first adhesive side to the top disk 122 and by a second adhesive side to the upper housing 102a. The compliant seal 130 has an opening corresponding with, and in between, the entrance hole 106 of the upper housing 102a and the input hole 126 of the top sealing disk 122. A lower compliant seal ring 132 between the output hole 128 of the bottom sealing disk 124 and the exit hole 108 of the lower housing 102b also provides an air seal and helps to prevent powder from escaping from between the output hole 128 and the exit hole 108.

Figure 5:
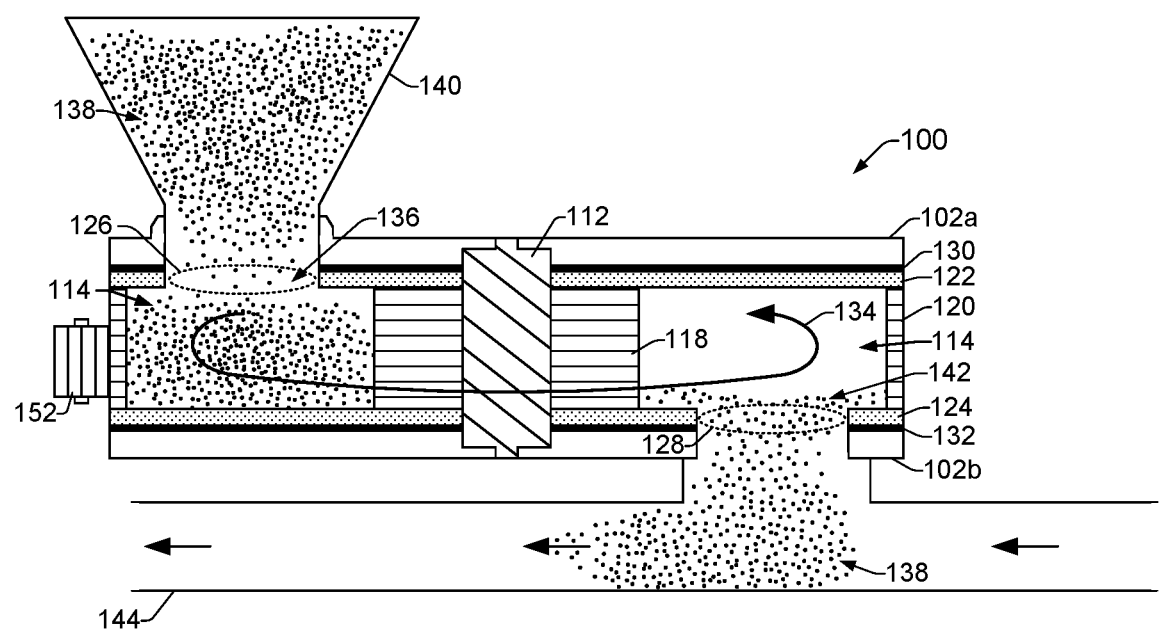
FIG. 5 shows a block diagram representation of an example powder metering device illustrating the rotation of compartments between a powder receiving position and a powder dispensing position.

FIG. 5 shows a block diagram representation of an example powder metering device 100 illustrating the rotation of compartments 114 between a powder receiving position and a powder dispensing position. Referring now primarily to FIGS. 1, 2, and 5, compartments 114 can receive powder as they rotate (e.g., in a direction shown by direction arrow 134) through a powder receiving position 136 situated underneath the input hole 126 of the top sealing disk 122. As shown in FIG. 5, the powder 138 can drop under the force of gravity from a powder hopper 140, for example, into each compartment 114 rotating past the powder receiving position 136 (i.e., under the input hole 126). As the compartments 114 continue to rotate, they pass over a powder dispensing position 142 situated above the output hole 128 of the bottom sealing disk 124. As shown in FIG. 5, the powder can drop under the force of gravity from the compartments 114 into another area of the 3D printing system, such as a pneumatic conveyance system 144.

As noted above, the top and bottom sealing disks 122, 124, seal the compartments 114 as they rotate between a powder receiving position and a powder dispensing position. In some examples, a powder receiving position and powder dispensing position can be associated with differently pressurized regions of a 3D printing system. Referring again to FIG. 5, for example, a hopper 140 may be used to collect and hold powder 138 under an ambient pressure condition. Thus, when a compartment 114 rotates into the receiving position 136 underneath input hole 126, it receives powder in the ambient pressure environment of the hopper 140. However, when a compartment 114 rotates into the dispensing position 142 situated above the output hole 128, it may be dispensing powder into a region under a different pressure condition. For example, as shown in FIG. 5, powder 138 may be dispensed into a pneumatic conveyance system 144 that moves the powder throughout a 3D printing system using an air flow under a positive or negative pressure. Thus, the powder metering device 100 enables the movement of powder between differently pressurized regions of the 3D printing system.

The top and bottom sealing disks 122, 124, facilitate the movement of powder between differently pressurized regions of a 3D printing system by sealing the compartments 114 as they rotate between the powder receiving position and the powder dispensing position. As the compartments 114 rotate from the powder receiving position to the powder dispensing position, they rotate through a pressure-isolation position that seals the compartments off from the pressure environments of both the receiving position and the dispensing position. The top sealing disk 122 has a planar surface 146 (FIGS. 1 and 2) that lies flush against the top edges of the fins 116, the central hub 118, and the peripheral wheel 120, to seal the top perimeter of each compartment 114 as the compartment rotates from the powder receiving position to the powder dispensing position. Similarly, the bottom sealing disk 124 has a planar surface 148 that lies flush against the bottom edges of the fins 116, the central hub 118, and the peripheral wheel 120, to seal the bottom perimeter of each compartment 114 as the compartment rotates from the powder receiving position to the powder dispensing position. A dust seal 150 is affixed to the top and bottom edges of the peripheral wheel to further control any powder that may escape from the compartments 114. The dust seal 150 can be formed of a felt material, for example.

Although the receiving of powder into compartments 114 and the dispensing of powder from compartments 114 has been discussed above with respect to one compartment 114 at a time, in other examples multiple compartments 114 can be receiving and dispensing powder simultaneously. For example, for three adjacent compartments 114 rotating on the rotor 110, a first of the three compartments can be almost fully past the input hole 126 but still partially positioned underneath the input hole 126, and still receiving powder. At the same time, a second of the three compartments can be fully positioned under the input hole 126 and receiving powder. At the same time, a third of the three compartments can be partially underneath the input hole 126 and moving more fully underneath the input hole 126 while receiving powder. In different examples, the input hole 126 and corresponding entrance hole 106 can comprise different shapes to accommodate filling multiple compartments 114 simultaneously. For example, the input hole 126 and corresponding entrance hole 106 shown in FIGS. 1 and 2 comprise an oblong shape to accommodate the filling of three compartments 114 simultaneously as just generally described. In a like manner, while multiple compartments 114 are being filled, multiple other compartments 114 can be dispensing powder simultaneously through the output hole 128. Thus, the powder metering device 100 enables simultaneously receiving powder into multiple compartments from a first pressure zone while simultaneously dispensing powder from multiple other compartments 114 into a second pressure zone.

Referring again generally to FIGS. 1 and 2, the powder metering device 100 can comprise a gear train 152 driven by a drive motor 154 to drive rotation of the rotor 110 and compartments 114. The gear train 152 can engage gear teeth 156 on the outer perimeter of the rotor 110, for example. Other drive mechanisms are also possible, such as belt drive systems, or a shaft driven system. As noted above, inner components of the powder metering device 100 can be compressibly enclosed within the housing, which includes the upper housing 102a and lower housing 102b. Compression of the top sealing disk 122, the rotor 110, and the bottom sealing disk 124, within the housing can enhance the sealing of the compartments 114. As shown in FIGS. 1 and 2, compression mechanisms 158 such as compression springs 158 can facilitate the compression of components within the housing. Other compression mechanisms 158 are also possible. In some examples, a compressible foam material can be used for a compression mechanism 158. A foam material compression mechanism 158 can help provide a more uniform force throughout the sealing disks, 122 and 124. This can help to maintain flatness of the sealing disks, 122 and 124, without having to rely on the stiffness of the disks.

Figure 6:
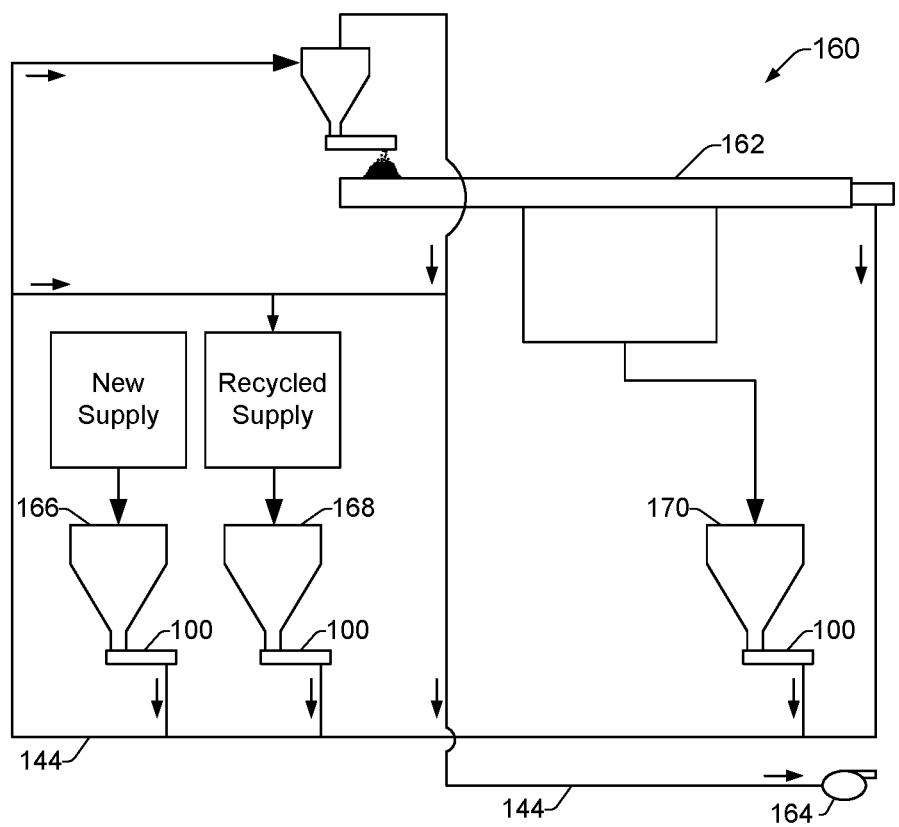
FIG. 6 shows a block diagram illustrating an example 3D printing system in which a powder metering device may be implemented.

FIG. 6 shows a block diagram illustrating an example 3D printing system 160 in which a powder metering device 100 may be implemented. The system 160 is shown by way of an example only and is not intended to represent a complete 3D printing system. An example 3D printing system 160 can print 3D objects in a build area 162 using powdered build material transported throughout the 3D printing system by a pneumatic powder conveyance system 144. A pneumatic powder conveyance system 144 can include a pressure blower 164 to apply pressurized air in transport tubes as powdered build material is being released into the tubes from a powder storage source, such as one or multiple hoppers. Hoppers can include, for example, a new material hopper 166, a recycled material hopper 168, and a reclaimed material hopper 170.

In some examples, hoppers can dispense powdered build material from one pressure environment into another pressure environment. For example, a hopper can be in an ambient pressure environment while delivering powder into another pressure environment, such as the pressurized environment of a pneumatic powder conveyance system 144. As described herein with respect to various examples, a powder metering device 100 enables the simultaneous receiving of powder from a first pressure environment and dispensing of powder into a second pressure environment. In the example 3D printing system 160 shown in FIG. 6, therefore, a powder metering device 100 may be implemented to deliver powder from a first pressure environment such as an ambient pressure environment in hoppers 166, 168, and 170, into a second pressure environment such as the pressurized environment of a pneumatic powder conveyance system 144.

Figure 7:
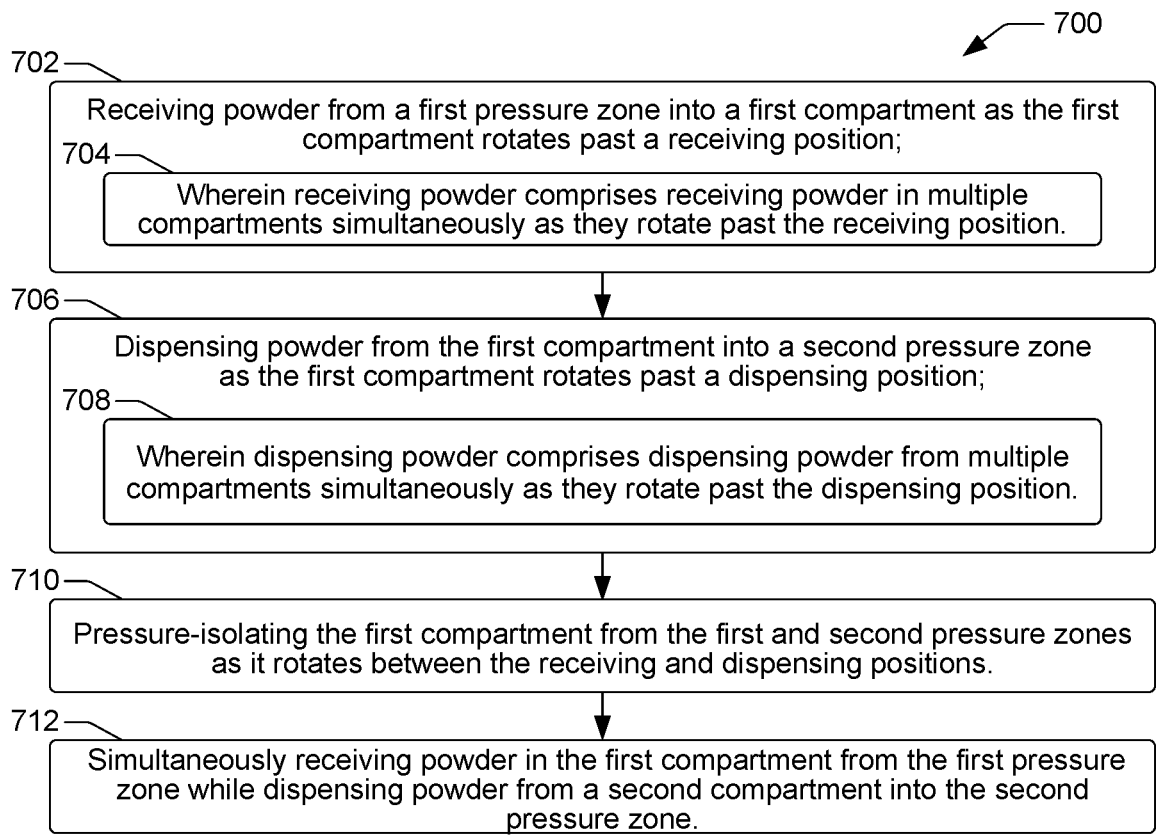
FIG. 7 shows a flow diagram of an example method of moving powder within a 3D printing system.

FIG. 7 shows a flow diagram of an example method 700 of moving powder within a 3D printing system. The example method 700 is associated with examples discussed above with respect to FIGS. 1-6, and details of the operations shown in method 700 can be found in the related discussion of such examples. The method 700 may include more than one implementation, and different implementations of method 700 may not employ every operation presented in the flow diagram of FIG. 7. Therefore, while the operations of method 700 are presented in a particular order within the flow diagram, the order of their presentation is not intended to be a limitation as to the order in which the operations may actually be implemented, or as to whether all of the operations may be implemented. For example, one implementation of method 700 might be achieved through the performance of a number of initial operations, without performing one or more subsequent operations, while another implementation of method 700 might be achieved through the performance of all of the operations.

Referring now to the flow diagram of FIG. 7, an example method of moving powder in a 3D printing system begins at block 702 with receiving powder from a first pressure zone into a first compartment as the first compartment rotates past a receiving position. In some examples, as shown at block 704, receiving powder include receiving powder in multiple compartments simultaneously as they rotate past the receiving position. As shown at block 706, the method 700 can continue with dispensing powder from the first compartment into a second pressure zone as the first compartment rotates past a dispensing position. In some examples where powder is received in multiple compartments simultaneously, dispensing powder can include dispensing powder from multiple compartments simultaneously as they rotate past the dispensing position, as shown at block 708.

Continuing at block 710, the method 700 can include pressure-isolating the first compartment from the first and second pressure zones as it rotates between the receiving and dispensing positions. The method 700 can also include simultaneously receiving powder in the first compartment from the first pressure zone while dispensing powder from a second compartment into the second pressure zone.

What is claimed is:

1. A 3D printing system with a powder metering device to move powder in the 3D printing system comprising:
    a build area for printing a 3D object;
    a first powder storage hopper to receive powder via a pressurized powder transport tube under a first pressure;
    a first powder metering device to deliver powder from the first storage hopper under the first pressure to the build area under a second pressure;
    a second powder storage hopper to receive reclaimed powder from the build area;
    a second powder metering device to deliver the reclaimed powder under the second pressure to the pressurized powder transport tube under the first pressure, each powder metering device comprising:
    a rotor comprising a central hub and peripheral wheel to rotate about a shaft;
    compartments formed between the hub and the wheel by a plurality of fins that emanate from the hub at first fin ends and affix to the wheel at second fin ends; and,
    a top and bottom disk each having a planar surface to lie flush against and to seal, respectively, top and bottom perimeters of each compartment as the compartments rotate about the shaft between a powder receiving position and a powder dispensing position.

2. A system as in claim 1, each powder metering device further comprising a pressure-isolating position to isolate each compartment from one pressure environment at the receiving position and another pressure environment at the dispensing position.

3. A system as in claim 1, each powder metering device further comprising:
    an input hole formed in the top disk to allow powder to enter a compartment as it rotates past the receiving position; and,
    an output hole formed in the bottom disk to allow powder to exit a compartment as it rotates past the dispensing position.

4. A system as in claim 3, each powder metering device further comprising an upper and lower housing fastened together to compressibly house the rotor and the top and bottom disks, the upper housing comprising an entrance hole through which powder from a respective powder storage hopper is deliverable through the upper housing and into a passing compartment through the input hole, and the lower housing comprising an exit hole corresponding with the output hole to dispense powder from the passing compartment.

5. A system as in claim 4, each powder metering device further comprising a compression mechanism to compress the top disk, the rotor, and the bottom disk together between the upper and lower housing.

6. A system as in claim 4, each powder metering device further comprising:
    a compliant seal between the top disk and the upper housing, the compliant seal adhered by a first adhesive side to the top disk and by a second adhesive side to the upper housing and having an opening between the entrance hole of the upper housing and the input hole of the top disk, the compliant seal to prevent any powder from escaping from between the entrance hole and the input hole.

7. A system as in claim 1, wherein the compartments formed between the hub and the wheel comprise a single compartment formed between the hub and the wheel.

8. A system as in claim 1, wherein the top and bottom disks comprise stationary disks to remain stationary as the compartments rotate between them.

9. A system as in claim 1, each powder metering device further comprising:
    geared teeth on an outer perimeter of the wheel;
    a gear train to engage the geared teeth to rotate the wheel; and,
    a drive motor to provide rotational drive to the gear train.

10. A method of moving powder in a 3D printing system comprising:
    receiving powder from a first pressure zone into a first compartment as the first compartment rotates past a receiving position;
    dispensing powder from the first compartment into a second pressure zone as the first compartment rotates past a dispensing position; and,
    pressure-isolating the first compartment from the first and second pressure zones as it rotates between the receiving and dispensing positions.

* * * * *